Oct. 24, 1967   R. G. HERTLEIN   3,348,738
DISPENSING HOPPER HAVING A CONTAINER OPENER
Filed Dec. 21, 1965   5 Sheets-Sheet 1
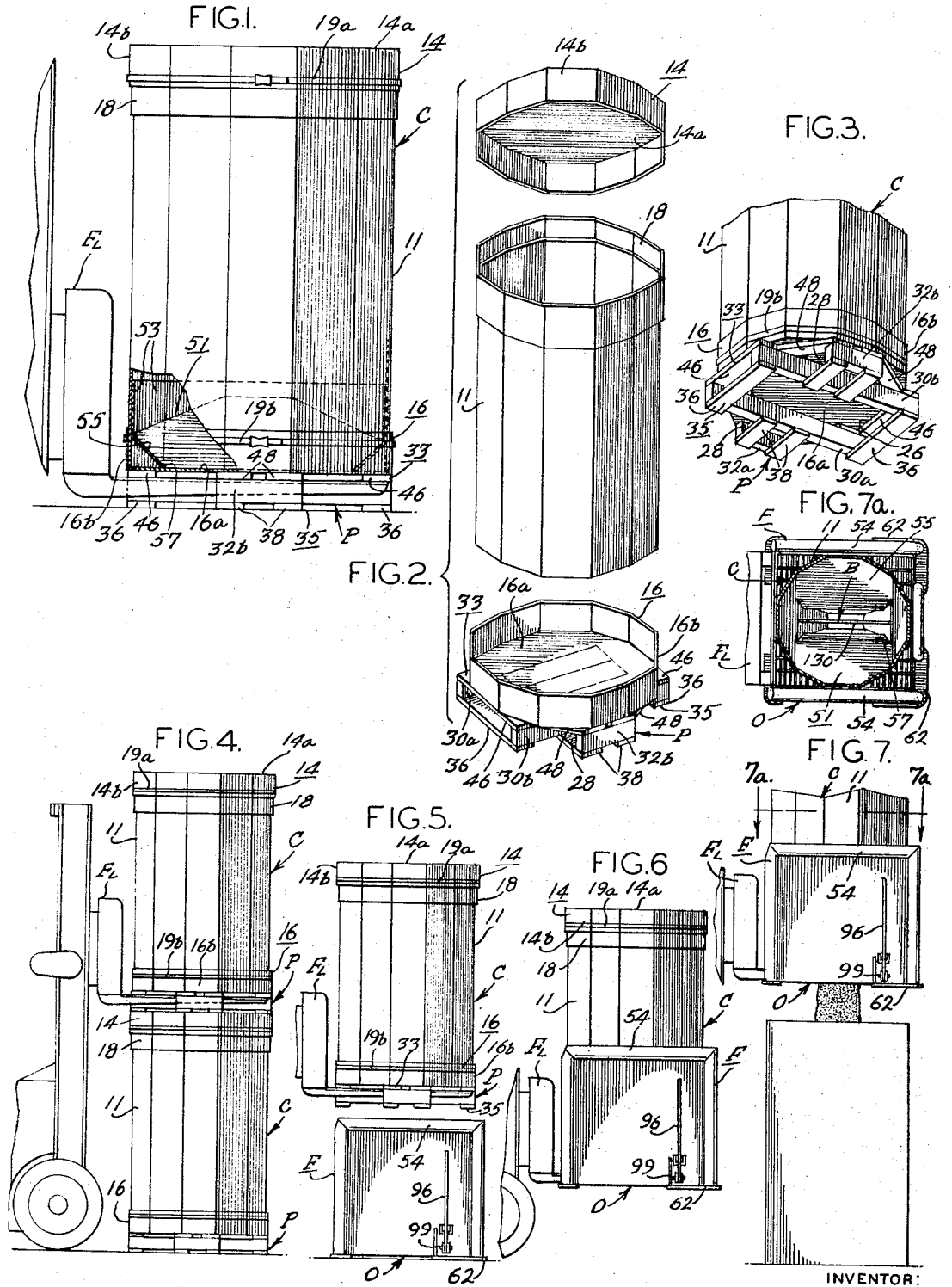
INVENTOR:
RONALD G. HERTLEIN
BY Howson & Howson
ATTYS.

Oct. 24, 1967  R. G. HERTLEIN  3,348,738
DISPENSING HOPPER HAVING A CONTAINER OPENER
Filed Dec. 21, 1965  5 Sheets-Sheet 2

INVENTOR:
RONALD G. HERTLEIN
BY Howson & Howson
ATTYS.

Oct. 24, 1967 R. G. HERTLEIN 3,348,738
DISPENSING HOPPER HAVING A CONTAINER OPENER
Filed Dec. 21, 1965 5 Sheets-Sheet 3
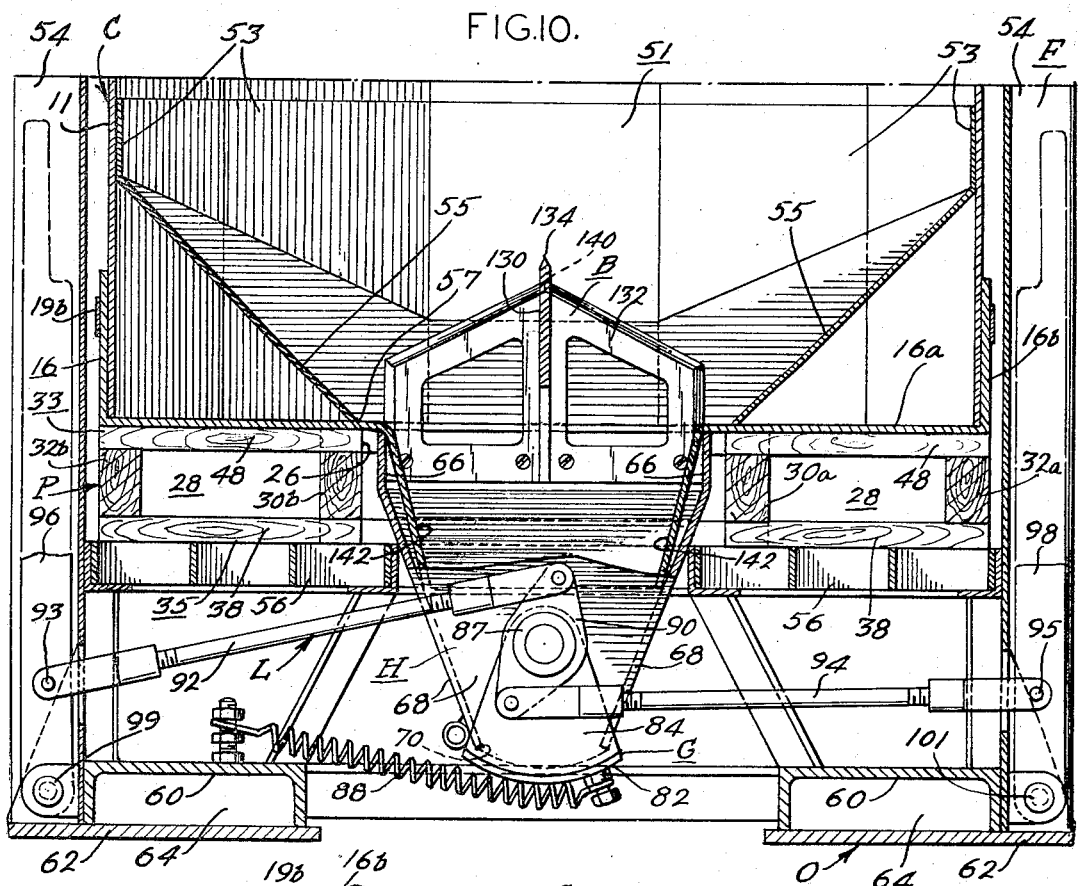
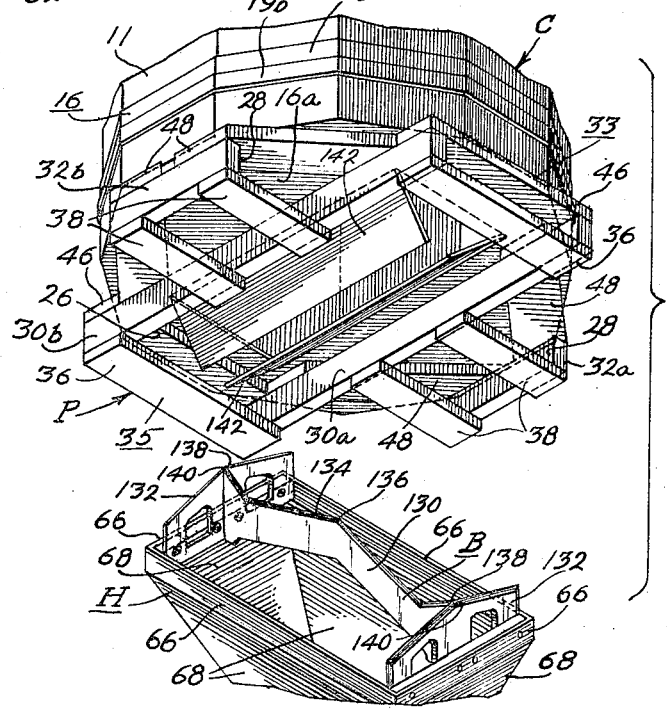
INVENTOR:
RONALD G. HERTLEIN
BY Howson & Howson
ATTYS.

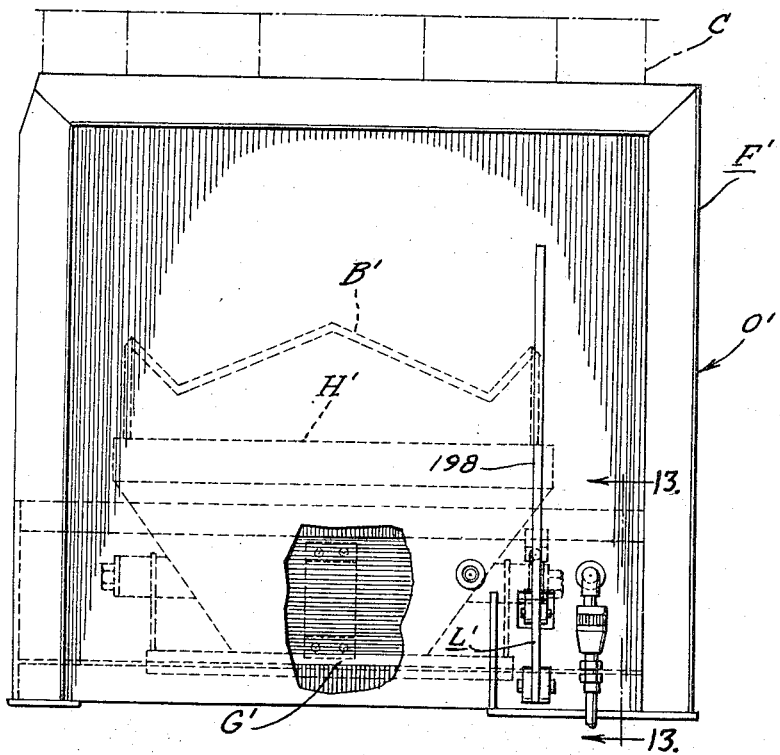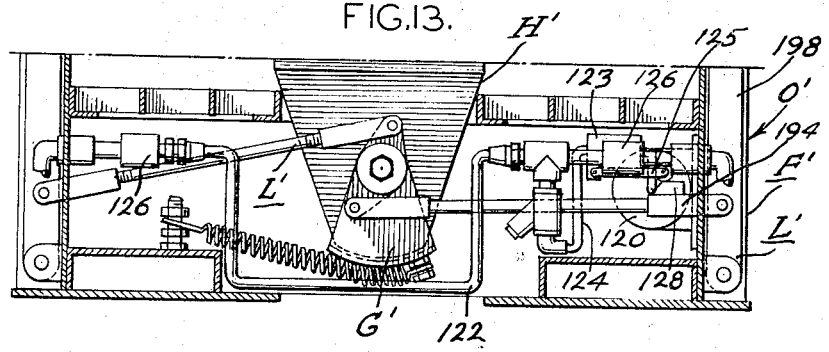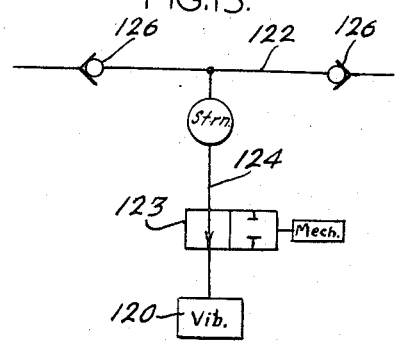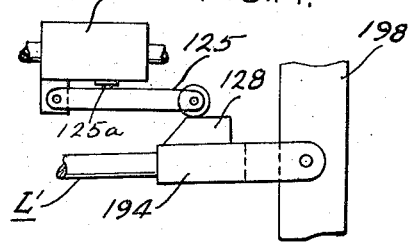

Oct. 24, 1967   R. G. HERTLEIN   3,348,738
DISPENSING HOPPER HAVING A CONTAINER OPENER
Filed Dec. 21, 1965   5 Sheets-Sheet 5

INVENTOR:
RONALD G. HERTLEIN
BY Howson & Howson
ATTYS.

United States Patent Office 3,348,738
Patented Oct. 24, 1967

3,348,738
DISPENSING HOPPER HAVING A CONTAINER OPENER
Ronald G. Hertlein, Crown Point, Ind., assignor to General Refractories Company, Philadelphia, Pa., a corporation of Pennsylvania
Filed Dec. 21, 1965, Ser. No. 515,298
4 Claims. (Cl. 222—88)

The present invention relates generally to a system for handling granular material, for example refractory material. More particularly, the present invention relates to a novel system for handling refractory material including a container for the material and a novel opener for use with the container facilitating discharge of the material from the container for use when desired.

Refractory material is used in many applications. For example, refractory material is used to fill a tap hole gum, shovel work in front of a furnace and to fill a charging box for a large bottom installation. In these applications generally large quantities of the refractory material are required. Heretofore the refractory material used in these operations was packaged in 100 lb. bags and in compartmentalized boxes having a capacity of about 2,000 pounds. These boxes are usually provided with a zip tab bottom opener to facilitate removal of the material from the box.

These boxes because of their construction, are comparatively expensive to manufacture, are clumsy to handle and, in some instances present a safety problem when they are opened at the site for use.

Furthermore, with the box type, once the zip tab is opened, all of the material in a compartment is discharged and in some instances the use might not require the full capacity of the box. This, of course, results in waste. It has been found that it is practically impossible to empty the boxes completely due to the fact that the material lodges in creases and folds in the box.

The present invention provides a system for handling granular material, particularly refractory material which overcomes the disadvantages and drawbacks of the prior method for handling refractory material discussed above. In accordance with the system of the present invention, there is provided a container for the refractory material comprising an elongated tubular body portion, a detachable lid at one end of the body portion and a lower closure member at the bottom of the container. A pallet is mounted on the lower closure of the container to facilitate transport of the containers from one location to another by means of a conventional forklift. The pallet is also designed to expose a central section of the lower closure of the container so that it may be positioned over a blade of an opener assembly to form a discharge opening in the bottom of the container permitting discharge of the material.

The opener assembly includes a discharge hopper below the cutting blade and a control gate for the hopper whereby selected predetermined quantities of the refractory material may be discharged from the container. The container also includes a tapered false bottom and the opener assembly may include a vibrator to insure complete discharge of the material from the container. Consider now briefly handling of the refractory material in accordance with the present invention. A conventional forklift may be employed to remove a container from storage and position it in the opener assembly whereby a discharge opening is automatically formed in the lower closure to permit discharge of refractory material. The opener and container may then be moved as a unit by the forklift to the site where the refractory material is needed. At the site the gate is opened to permit discharge of selected quantities of the material. This operation is obviously much simpler, less time consuming and safer than the method employing compartmentalized boxes discussed above. Further it is noted that since the containers have a much greater capacity than the tab opened boxes, less time is spent in handling of the refractory material.

From the foregoing, it is readily apparent that in accordance with the system of the present invention, a granular material, particularly refractory material, may be handled more easily, safer and more economically than the prior systems heretofore used.

Thus, a primary object of the present invention is to provide a system for handling granular material, particularly refractory material, which is fast, economical and safe.

Another object of the present invention is to provide a container and opener combination and such a refractory material handling system which is characterized by novel features of construction and arrangement and which permits the fast, efficient and economical handling of refractory material.

These and other objects of the present invention and the various features and details of the operation and elements of the system are hereinafter more fully set forth with reference to the accompanying drawings, wherein:

FIG. 1 is a side elevational view of a container for refractory material partly in section to show the internal construction thereof;

FIG. 2 is an exploded perspective view of the container shown in FIG. 1;

FIG. 3 is a fragmentary perspective view of the lower portion of the container;

FIG. 4 is a side elevational view showing a pair of containers stacked one on top of the other;

FIG. 5 is a side elevational view showing the container about to be positioned on an opener;

FIG. 6 is a view similar to FIG. 5 showing the container and opener being lifted;

FIG. 7 is a fragmentary side elevational view showing the container and the opener with the material being discharged through the discharge opening in the container;

FIG. 7a is a sectional view of the container taken on lines 7a—7a of FIG. 7;

FIG. 10 is an enlarged sectional view taken on lines 10—10 of FIG. 9 with a carton in position on the opener;

FIG. 11 is an exploded perspective view of the lower portion of the container and the cutting blade of the opener;

FIG. 12 is a side elevational view partly in section of a modified form of container opener in accordance with the present invention;

FIG. 13 is an enlarged sectional view taken on lines 13—13 of FIG. 12;

FIG. 14 is a fragmentary view of part of the control system for actuating the vibrators;

FIG. 15 is a schematic illustration of the circuitry for the vibrators;

Figure 8:
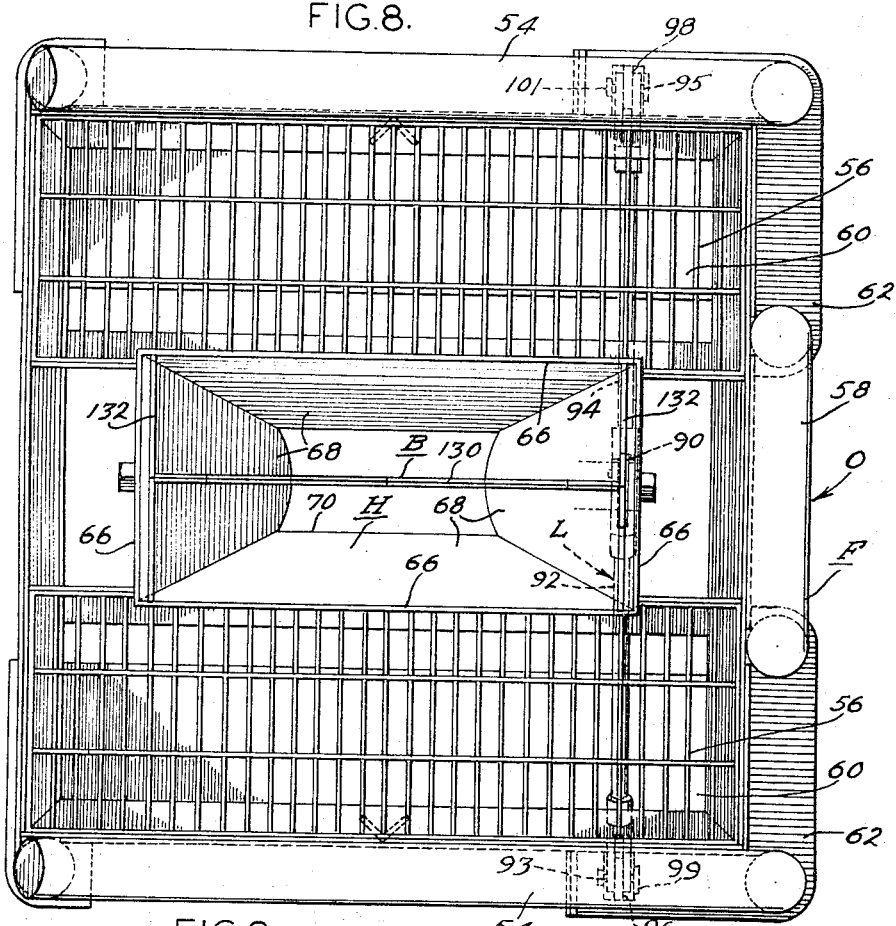
FIG. 8 is an enlarged plan view of the opener of the present invention.

Considering the broad components of the system for handling granular material, for example, refractory material, the refractory material is packed in an elongated, tubular container C having a detachable lid at one end and a bottom closure at its opposite end. The refractory material is adapted to be selectively discharged as needed through the bottom closure. To this end, in the present instance a pallet is mounted on the lower closure member of the container, the pallet P being of a construction to facilitate movement of the container from one location to another by a conventional forklift $F_L$ and also being constructed to expose a portion of the bottom of the container. The system further includes an opener assembly O having a discharge hopper H and a control gate G selectively actuatable relative to the discharge opening in the hopper to permit discharge of material therethrough and a blade B adjacent the top of the hopper. By this arrangement, the container may be lowered over the blade on the opener assembly whereby a discharge opening is formed in the bottom of the container to facilitate discharge of desired quantities of material therefrom.

Considering now more specifically the components of the system, the container C which is best illustrated in FIGS. 1–3 comprises an elongated, polygonal body portion 11, a detachable cover or lid 14 adapted to fit over one open end of the body portion and a lower end closure member 16 adapted to close the lower end of the body portion. In the present instance, the body portion is provided with a collar or sleeve 18 at its upper end which circumscribes the body portion 11 and is movable longitudinally providing a flexible section adapted to slip down on settling of the material in the container to facilitate stacking of containers. As illustrated, the lid 14 has a flat planar top 14a having a peripheral side edge conforming to the cross section of the body portion 11 and a depending polygonal skirt 14b which overlies and embraces the upper side edge of the collar 18 in the assembled container. The lower end closure 16 has a flat planar bottom wall 16a overlying the open end of the body portion 11 and having a periphery conforming to the cross section of the body portion and an upstanding peripheral polygonal lip 16b overlying and embracing the lower side of the body portion in the assembled container. The lid 14 and lower closure 16 may be secured to the body portion by suitable means, in the present instance tightenable metal bands 19a and 19b.

In the present instance the pallet P is mounted on the bottom wall 16a of the closure member 16 and is designed to facilitate moving of the container by a forklift $F_L$ from one location to another and also to permit an opening to be formed in the bottom wall 16a for discharge of material.

To this end the pallet P construction defines a central rectangularly shaped opening 26 exposing a portion of the bottom wall 16b and a pair of channels 28 on opposite sides of the central rectangular opening 26 and aligned longitudinally therewith to receive the arms of a forklift $F_L$. More specifically with reference to FIG. 3, the pallet P which may be made of wood, consists of a pair of elongated, parallel spaced apart inner stringers 30a, 30b for example, two-by-threes and a pair of shorter stringers 32a, 32b, also two-by-threes spaced outwardly and parallel to the inner stringers 30a, 30b, the spaces between the inner and outer stringers defining the channels 28. The inner and outer stringers are supported in the relation shown between an upper deck 33 fastened to the bottom wall 16b, for example by glue, and a lower deck 35. The lower deck 35 consists of flat wooden deck pieces or runners 36 secured by nails adjacent the outer terminal ends of the stringers 30a, 30b and pairs of deck pieces or runners 38 secured to the outer ends of the short stringers 32a, 32b and the stringers 30a, 30b inboard of their terminal ends. The upper deck 33 consists of flat runners 46 overlying and parallel to the runners 36 connecting the ends of the stringers 30a, 30b in spaced parallel relation and pairs of angularly disposed deck pieces or runners 48 connected the short and long stringers.

The container C may be provided with a false bottom generally designated by the numeral 51 which is designed to direct material in the conveyor toward a discharge opening which is formed in the bottom wall thereof when it is seated on the blade of the opener assembly. To this end, the false bottom includes an upright peripherally extending polygonal side wall 53 and a bottom wall 55 depending from the side wall which converges inwardly at an angle to define a centrally disposed rectangularly shaped opening 57 exposing a rectangular section of the wall 16b of the container C.

In assembling the container C, the deck pieces and stringers forming the pallet P are assembled in the manner described above. Thereafter, the pallet assembly is secured to the lower closure member 16, for example by means of an adhesive and/or tacks, common nails or other suitable fastening means. The pallet P is positioned relative to the bottom closure which is usually made of cardboard so that the grain of the cardboard runs crosswise to the rectangular open area 26 of the pallet. The false bottom 51 is positioned interiorly of the body portion 11 adjacent its lower end and thereafter the bottom portion is seated in the lower end closure member 16 and secured thereto by means of the metal band 19b. The container is then filled with refractory material, after which the lid is secured over the open upper end by means of a band 19a.

Figure 9:
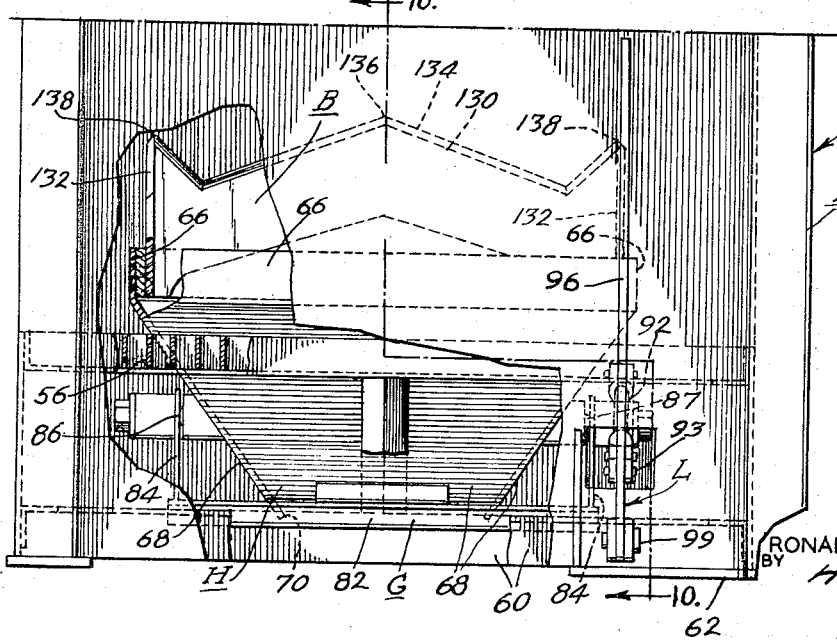
FIG. 9 is a fragmentary side elevational view partly in section of the opener shown in FIG. 8.
Figure 16:
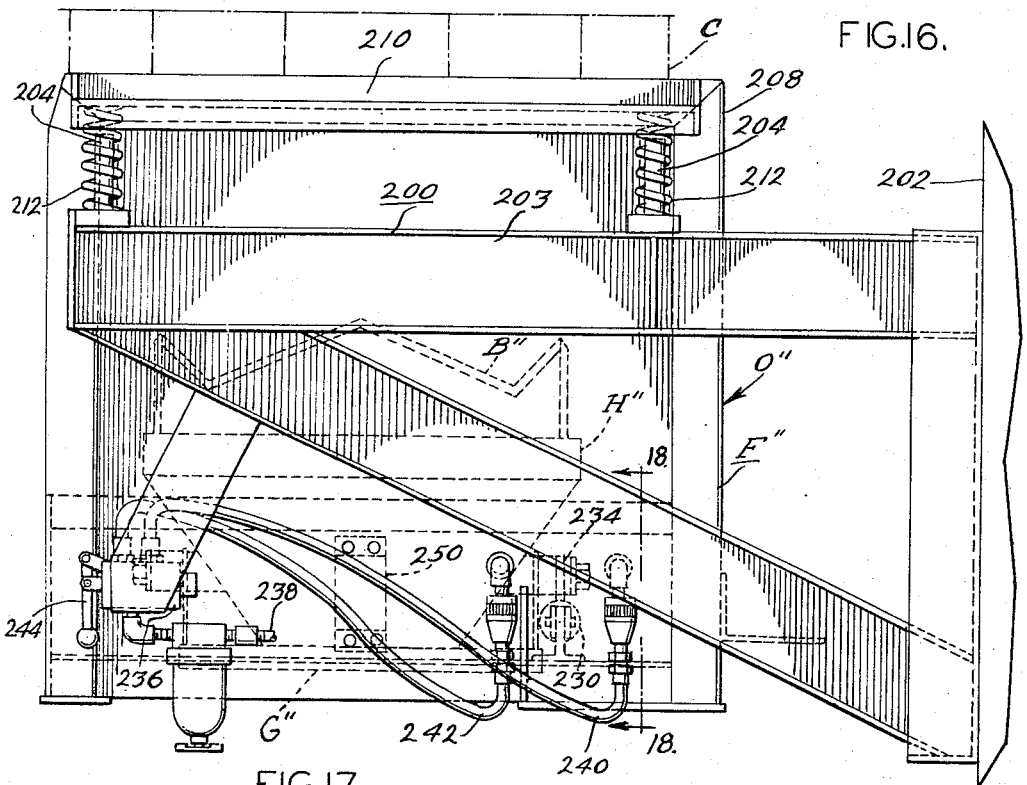
FIG. 16 is a side elevational view of another modified form of the opener in accordance with the present invention.
Figure 17:
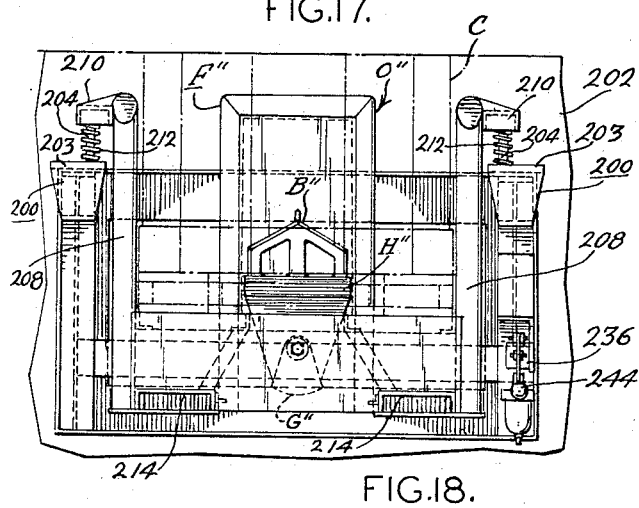
FIG. 17 is a front view of the opener of FIG. 16.
Figure 18:
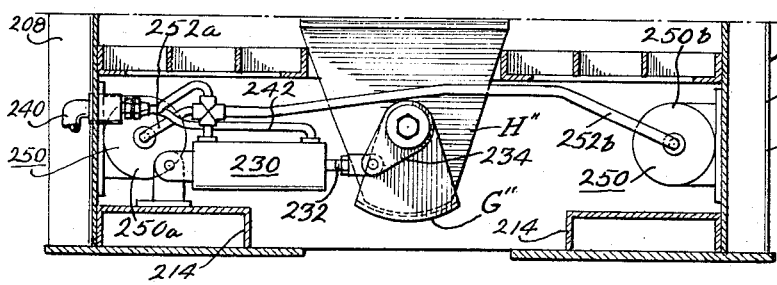
FIG. 18 is an enlarged sectional view taken on lines 18—18 of FIG. 16.
Figure 19:
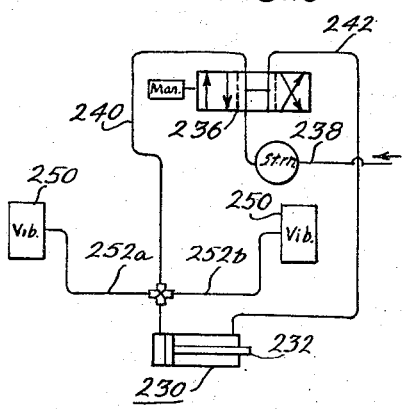
FIG. 19 is a schematic illustration of the circuitry for the vibrators and the gate control system.

Considering now the specific structural details of the opener assembly O and particularly with reference to FIGS. 8, 9 and 10, the opener includes a main frame structure F comprising a pair of upstanding, spaced apart parallel sides 54, a generally rectangular foraminous platform 56 between the side walls and spaced upwardly from the lower edges thereof, and an inverted U-shaped bracket 58 mounted between the side walls adjacent one end of the platform 56. A pair of spaced apart elongated channel members 60 are mounted inboard of the opposed side walls 54 adjacent the lower edges thereof and extend the length of the opener. A pair of pads 62 close the open sides of the channel members 60 to define elongated slots 64 running the length of the opener to receive the arms of the forklift for purposes to be described in more detail hereinafter. A hopper H is mounted centrally of the platform 56 and as illustrated, includes four rectangularly disposed upright upper side walls 66 and lower side wall extensions 68 depending from the upper side walls and converging inwardly to define a funnel having a discharge opening 70 at its lower end. As illustrated, the top edge of the hopper H is disposed above the upper edge of the platform 56 and this distance is approximately equal to the height of the pallet assembly so that when the container C is positioned over the hopper, the bottom wall 16b of the container lies approximately flush with the top edge of the hopper.

Discharge of material through the hopper discharge opening 70 is controlled by a gate assembly G which comprises an arcuate wall 82 and a pair of side supporting brackets 84 for pivotally mounting the gate assembly to the hopper as at 86 and 87. The gate 80 is normally biased to a closed position to close the opening in the hopper by means of a tension spring 88 and is actuable to an open position when it is desired to discharge through the hopper through a linkage system L. The linkage system L includes a link 90 secured to one of the shafts pivotally mounting the gate assembly, a pair of actuator arms 92 and 94 pivotally connected at their inner ends to opposed ears of the link 90 and pivotally connected at their outer ends as at 93 and 95 respectively to a pair of hand levers 96 and 98 pivotally connected as at 99 and 101 respectively the frame structure. By this arrangement, when it is desired to actuate the gate assembly G to expose the discharge opening 70 in the hopper to discharge material, either one of the hand levers 96 or 98, depending on which side of the opener the operator is positioned, is pulled outwardly away from the side wall of the opener whereby the actuator arms 92 and 94 rotate the link 90 to turn the gate G against bias of the spring 88 to a position retracting arcuate wall 82 from the opening of the hopper. When the desired amount of material has been discharged from the hopper, the lever is simply released and the gate assembly returns to its closed position.

The opener assembly O includes a cutting blade B which is adapted to pierce the bottom wall 16b of the container C when the container is positioned in the opener. The cutting blade B is mounted above the hopper and as best illustrated in FIGS. 9, 10 and 11, comprises a central elongated section 130 disposed parallel to the side walls of the opener assembly and a pair of end sections 132 positioned adjacent opposite ends of the central section 130 and extending perpendicular thereto. The cutting edge 134 of the central section 130 is W-shaped in profile with the center peak 136 projecting above a plane passing through the end peaks 138. Each of the end sections 132 is of inverted V-shaped configuration, the peak 140 of the blade lying in the same plane as the peaks 138 of the central section. By this arrangement, as the container is lowered over the cutting blade B, the peak 136 of the central blade initially pierces the container and thereafter the end peaks 138 and cutting edges of the end sections 132 pierce the lower wall 16b of the container to inscribe an H-shaped cut therein. Now the weight of the material pushes the flaps 142 formed by the H-cut downwardly as it discharges through the opening in the bottom of the container.

There is shown in FIGS. 12–15 inclusive, a modified form of the opener. The structural details and arrangement of this embodiment are similar to that described, the opener assembly O' including a framework F', a hopper H' mounted in the framework, opener blade B' supported at the top of the hopper and a linkage system L' for selectively actuating the gate G' between an open position permitting discharge through the hopper and a closed position closing the bottom of the hopper. However, in the present instance, means is provided for vibrating the opener assembly and a container mounted therein during discharge of material to facilitate complete discharge of the material from the container. To this end, there is provided at least one vibrator 120, in the present instance a pneumatically operated vibrator, mounted on the framework and a line system connecting the vibrator to an air supply source. In the present instance, the line system includes a conduit 122 which can for convenience be provided with snap couplings at its terminal ends to permit attachment of flexible air supply lines and a branch 124 from the conduit 122 to the vibrator. A pair of check valves 126 is provided in the conduit 122 to permit flow to the branch 124 from either end of the conduit 122. A control valve 123 in the branch 124 is normally held in a closed position by means of a lever-actuated plunger 125a, the lever 125 being positioned to hold the plunger in a closed position by engagement with a cam 128 on the arm 194 of the linkage system L'. Now, when the hand lever 198 is pivoted outwardly to open the gate G', the lever 125 rides down the cam face 128 and the plunger 125a of the control valve is moved to a position to open the valve whereby the vibrator is actuated.

There is shown in FIGS. 16–19 inclusive a further modification of the opener for the material handling system of the present invention. The overall construction of the opener assembly O" is similar in some respects to that described above. Thus, the opener assembly includes a frame structure F" including a pair of spaced apart, upstanding side walls 208 having outwardly directed extensions 210 at their upper edges. This opener assembly O" is adapted for mounting at a fixed location such as on a pair of spaced apart support brackets 200 mounted against a structure such as wall 202. Each projecting arm 203 of the support bracket carries a pair of spaced apart pins 204 mounting springs 212 on which the side extensions 210 seat whereby the opener is resiliently mounted on the supporting framework F". The opener assembly O" further includes a pair of elongated channel members 214 running the length of the assembly adjacent opposite side walls thereof providing channels within which the arms of a lift engage to selectively position the opener assembly in the support brackets 200. A hopper H" which mounts at its upper end a cutting blade B" basically of identical construction as that described above is provided and a gate assembly G" is pivotally supported at the lower end of the hopper which is selectively actuable between a retracted position closing the opening of the hopper and a position removed from the bottom of the hopper to permit material to be discharged therethrough.

In the present instance, automatic actuating system is provided for selectively actuating the gate G" between open and closed positions. The actuating system includes a piston-cylinder actuator 230 mounted on the frame, the piston rod 232 of which is connected to the link 234 for pivoting the gate G". The actuating system further includes a four-way control valve 236, a supply line 238 connected to a suitable air source and a pair of lines 240 and 242 connecting the four-way valve to opposite sides of the piston-cylinder actuator in the manner shown in FIG. 19. By this arrangement in the normal position of the four-way valve shown in FIG. 19, the gate G" is in the closed position. Now when it is desired to open the gate G", the control lever 244 for the four-way valve 236 is actuated to open the valve whereby the piston rod 232 is displaced in the piston cylinder to pivot the gate G" to an open position. The control lever 244 is moved to a retract position to close the gate G".

This embodiment also includes a pair of vibrators 250 mounted on opposite side walls of the opener assembly which are pneumatically actuatable and in the present instance are connected through lines 252a and 252b to the line 240. By this arrangement, when the control lever 244 is moved to a position to open the gate G", the vibrators 250a and 250b are automatically actuated. It is noted that the mounting of the opener assembly on the spring insures good vibration of the unit to loosen material in the container and insure complete emptying thereof.

Considering now the operation of the system, refractory material which is packed in the containers may be hauled from one location to another by means of conventional forklifts and if desired, stacked one on top of another as illustrated in FIG. 4, the construction of the pallet facilitating transportation of the containers in this manner. It is noted that the container is sturdily constructed and therefore may be made of a large size to contain as much as 4,000 pounds of refractory material. Further, it is noted that these containers may be stacked and packed very closely to one another so that it is possible to more efficiently store and transport the refractory material. Now, when it is desired to use refractory material in the containers, the container is conveyed by a forklift $F_L$ in the manner illustrated in FIG. 5 and positioned over the opener assembly. The container is lowered so that the blade engages interiorly of the rectangularly shaped opening in the pallet. When the container is lowered so that the container rests on the platform, the central section of the knife blade engages the bottom wall of the container initially to provide an elongated, longitudinally extending slit in the container. Now as the container is lowered further, the side blades which are disposed below the central blade section form cuts at opposite ends of the central slit to provide a generally H-shaped cut in the bottom of the container. It is noted that the central generally rectangular opening in the false bottom is of a size so that the cutting blade does not cut any of the false bottom. The flaps formed now bend downwardly due to the weight of the material and the refractory material accumulates in the hopper. Now when it is desired to use the refractory material, and in the case of the principal embodiment, either one of the levers 96 or 98 is simply manually pulled outwardly to retract the gate G from the hopper discharge opening and permit discharge of the material. In the embodiment shown in FIG. 12, actuation of the hand lever 196 and 198 automatically initiates operation of the vibrating unit 120 to vibrate the opener assembly and the container to preclude accumulation of material in the bottom of the container. It is noted that the slanted walls of the false bottom also facilitate emptying of the container. In the embodiment shown in FIGS. 16-19 inclusive, the gate G″ may be opened and the vibrators actuated simply by operation of the control valve 236.

While particular embodiments of the present invention have been illustrated and described herein, it is not intended to limit the invention and changes and modifications may be made within the scope of the following claims.

I claim:

1. An opener assembly for use with a container to facilitate discharge of the contents of the container comprising a frame structure including a deck on which the container seats, a hopper having a lower discharge opening depending from the deck, a gate cooperatively associated with said discharge opening and adapted for movement between a first position closing said discharge opening and a second position remote therefrom to permit discharge of material through said discharge opening, a cutting blade mounted on the upper open end of the hopper comprising an elongated central section of W-shaped profile having a central peak higher than the end peaks and a pair of inverted V-shaped sections normal to the central section and disposed one at each end of the central section, the crest of the V being in the same plane as the end peaks of the central section.

2. An opener assembly as claimed in claim 1 including a linkage system including a hand lever pivotally connected to said frame structure for selectively disposing and said gate between said first and second positions.

3. An opener assembly as claimed in claim 1 including a vibrator mounted on said frame structure and means for selectively actuating said vibrator to vibrate said opener assembly and a container mounted thereon to facilitate discharge of all of the material from the container.

4. An opener assembly as claimed in claim 3 including a control circuit for effecting operation of said vibrator when said gate is disposed in said second position.

References Cited

UNITED STATES PATENTS

| | | | |
|---|---|---|---|
| 938,954 | 11/1909 | Bittrich | 222—558 X |
| 1,705,502 | 3/1929 | Schellentrager | 222—202 X |
| 1,885,978 | 11/1932 | Bobrick | 222—88 |
| 2,002,610 | 5/1935 | Nall | 222—86 X |
| 2,603,342 | 7/1952 | Martinson | 222—504 X |
| 2,837,242 | 6/1958 | McLaughlin | 222—88 |
| 3,061,152 | 10/1962 | Safianoff et al. | 222—88 X |

WALTER SOBIN, *Primary Examiner.*